(12) United States Patent
Lee

(10) Patent No.: US 9,705,347 B2
(45) Date of Patent: Jul. 11, 2017

(54) CHARGING SOCKET

(71) Applicant: Shuen-Ching Lee, New Taipei (TW)

(72) Inventor: Shuen-Ching Lee, New Taipei (TW)

(*) Notice: Subject to any disclaimer, the term of this patent is extended or adjusted under 35 U.S.C. 154(b) by 216 days.

(21) Appl. No.: 14/788,486

(22) Filed: Jun. 30, 2015

(65) Prior Publication Data

US 2016/0006285 A1 Jan. 7, 2016

(30) Foreign Application Priority Data

Jul. 2, 2014 (TW) .............................. 103211768 U

(51) Int. Cl.
*H01R 13/60* (2006.01)
*H02J 7/00* (2006.01)

(52) U.S. Cl.
CPC .......... *H02J 7/0052* (2013.01); *H02J 7/0045* (2013.01); *H02J 7/0047* (2013.01); *H02J 7/0072* (2013.01); *H02J 2007/0062* (2013.01)

(58) Field of Classification Search
CPC ........ H01R 13/44; H02J 7/0042; H02J 7/0045
USPC .......................... 439/131, 929; 320/113, 115
See application file for complete search history.

(56) References Cited

U.S. PATENT DOCUMENTS

| | | | | |
|---|---|---|---|---|
| 3,794,956 A | * | 2/1974 | Dubreuil | H02G 3/185 174/486 |
| 4,763,300 A | * | 8/1988 | Yukawa | G06F 1/183 273/148 B |
| 4,773,032 A | * | 9/1988 | Uehara | G06F 1/183 439/131 |
| 5,122,069 A | * | 6/1992 | Brownlie | G02B 6/4451 174/53 |
| 5,142,573 A | * | 8/1992 | Umezawa | H04M 1/06 379/441 |
| 5,144,290 A | * | 9/1992 | Honda | G06F 1/1616 16/306 |
| 5,598,319 A | * | 1/1997 | Lee | A63F 13/90 361/679.33 |
| 5,686,810 A | * | 11/1997 | Yasui | H01M 10/46 320/107 |
| 5,755,582 A | * | 5/1998 | Charlton | H02G 3/185 292/219 |
| 6,028,267 A | * | 2/2000 | Byrne | H01R 13/518 174/55 |
| 6,046,405 A | * | 4/2000 | Obermann | H02G 3/185 174/17 CT |
| 6,127,630 A | * | 10/2000 | McKenzie | H02G 3/14 174/58 |

(Continued)

*Primary Examiner* — Neil Abrams
(74) *Attorney, Agent, or Firm* — Muncy, Geissler, Olds & Lowe, P.C.

(57) ABSTRACT

A charging socket comprises a casing. A press and detain switch and a circuit board are accommodated and positioned inside the casing. A movable base is positioned above an opening of the casing. The movable base is connected with an end of a press portion. One end of the movable base is pivotally connected with the casing. At least one plugging base is inbuilt inside another end of the movable base. The plugging base is electrically connected with the circuit board. Accordingly, when the movable base is pressed to move together with the press portion and expose the plugging base, an electrical device can be charged electrically. When the movable base is pressed to hide the plugging base, the plugging base is open-circuited for safety.

5 Claims, 6 Drawing Sheets

(56) References Cited

U.S. PATENT DOCUMENTS

| | | | | |
|---|---|---|---|---|
| 6,400,969 | B1* | 6/2002 | Yamashita | H01H 3/16 |
| | | | | 320/114 |
| 6,438,229 | B1* | 8/2002 | Overy | H02J 7/0044 |
| | | | | 379/446 |
| 6,626,686 | B1* | 9/2003 | D'Souza | A47B 21/0314 |
| | | | | 248/118.1 |
| 7,230,822 | B2* | 6/2007 | Langberg | G11B 33/122 |
| | | | | 248/917 |
| 7,999,419 | B2* | 8/2011 | Drane | H01H 3/161 |
| | | | | 307/326 |
| 8,323,040 | B2* | 12/2012 | Prest | H01R 13/44 |
| | | | | 439/131 |
| 8,482,252 | B2* | 7/2013 | Byrne | G11B 33/122 |
| | | | | 320/113 |
| 8,610,403 | B2* | 12/2013 | Chen | H02J 7/0044 |
| | | | | 320/107 |
| 8,951,054 | B2* | 2/2015 | Byrne | H01R 13/447 |
| | | | | 307/104 |
| 9,036,361 | B2* | 5/2015 | Schrock | G11B 33/124 |
| | | | | 211/77 |
| 9,130,332 | B2* | 9/2015 | Yosef | H01R 31/06 |
| 9,178,299 | B2* | 11/2015 | Alexia | H01R 13/44 |
| 9,192,067 | B2* | 11/2015 | Kim | H05K 7/02 |
| 9,257,799 | B2* | 2/2016 | Stubbs | H01R 13/73 |
| 9,356,454 | B2* | 5/2016 | Caren | H02J 7/0045 |
| 9,362,765 | B1* | 6/2016 | Blaszczak | H01R 31/065 |

* cited by examiner

CHARGING SOCKET

BACKGROUND OF THE INVENTION

Field of Invention

The present invention relates to a charging socket and more particularly to a charging socket for connecting to a direct current (DC) source and disposing at a fixed location for charging electrical devices via USB.

Related Art

Under the trend of digitalization, electrical devices such as personal digital assistant (PDA), mobile phone, digital camera and video recorder, walkman and lighting have become very popular. The most common interface used in these devices is Universal Serial Bus (USB) for data transmission and charging. Therefore, manufacturers of electrical devices have already included charger as standard equipment for charging the batteries of electrical devices.

Generally, electrical devices charging requires connector of external charger for connecting with alternating power supply. The alternating current is then rectified and the voltage is reduced inside the charger. The charger is connected to the electrical device via a wire and a connector for charging the battery. However, users purchase new electrical devices or own different types of electrical devices will cause the following problems because of the many various types of chargers: 1) various types of chargers require more storage space and the chargers can be easily mixed up; 2) users will need to buy new chargers if they are damaged or lost because each type of charger cannot be replaced by another type, this will increase the purchasing costs and is a waste of resources; 3) even though the chargers can be used directly for charging, they still need to be taken out and socket for charging needs to be located which are very inconvenient; and 4) if only the electrical device is plugged out after the charging is done, the unplugged charger in the socket will continue to consume electricity and waste the power resource.

In order to solve the above problems, Taiwan patent publication number M376027 "Embedded Charging Socket" has provided the solutions. However, the structures of "Embedded Charging Socket" cannot be adapted to fit the USB adapter for cars and outdoor. Furthermore, common USB adapter for cars is plugged into the socket of cigarette lighter; besides that the USB adapter for cars can only be used for a single electrical device, it is exposed to dust. As a result, safety is concerned and it will break down more easily.

SUMMARY OF THE INVENTION

In view of the above, a charging socket of the present invention is provided to improve the above drawbacks and to achieve the following objectives.

A primary objective of the present invention is to provide a charging socket. By disposing at least one plugging base in a movable base and the hidden and exposed structure of the plugging base caused by the swing movement of the movable base, the problem of conventional adapter being exposed to dust can be solved. The charging socket of the present invention is convenient to use and can reduce the malfunction probability effectively.

A secondary objective of the present invention is to provide a charging socket. By disposing at least one plugging base in a movable base, and the plugging base is either electrically connected or interrupted caused by the swing movement and positioning of the movable base; the input power supply can be interrupted when charging is finished. Therefore, power source can be saved and safety can be ensured.

In order to achieve the above-mentioned objectives, the charging socket of the present invention comprises a casing, a press and detain switch, a circuit board and a movable base. The casing is disposed with an accommodating space with an opening. The press and detain switch is accommodated and positioned inside the accommodating space. A direct current input end and a direct current output end are disposed at an end of the press and detain switch. A press portion for controlling whether the direct current input end and the direct current output end are electrically connected or interrupted is disposed at another end of the press and detain switch. The circuit board is electrically connected with the direct current output end for reducing the direct current voltage inputted via the direct current input end. The movable base is positioned above the opening of the casing. One end of the movable base is pivotally connected with the casing. At least one plugging base is inbuilt inside another end of the movable base. The plugging base is electrically connected with the circuit board. The movable base is connected with an end of the press portion, so that when the movable base is pressed, the press portion is moved together with the movable base.

When the charging socket is embodied, the circuit hoard has an electrically connected step-down circuit and an electrically connected stabilizer circuit.

When the charging socket is embodied, the press and detain switch comprises a lift driver and a switch. The press portion is formed on top of the lift driver. The direct current input end and the direct current output end are connected with the switch at the same time.

When the charging socket is embodied, the plugging base is a USB slot.

When the charging socket is embodied, a power indicating light is further disposed on the movable base. The power indicating light is electrically connected with the circuit board. Accordingly, when the plugging base is electrically connected, the power indicating light emits light.

The present invention will become more fully understood by reference to the following detailed description thereof when read in conjunction with the attached drawings.

DETAILED DESCRIPTION OF THE INVENTION

Figure 1:
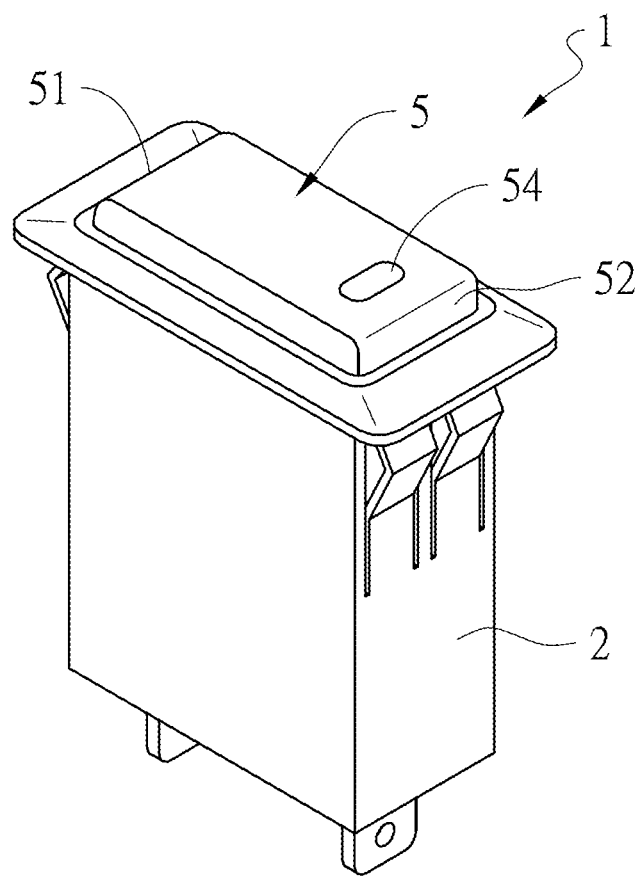
FIG. 1 is a perspective view of a charging socket according to a preferred embodiment of the present invention.
Figure 2:
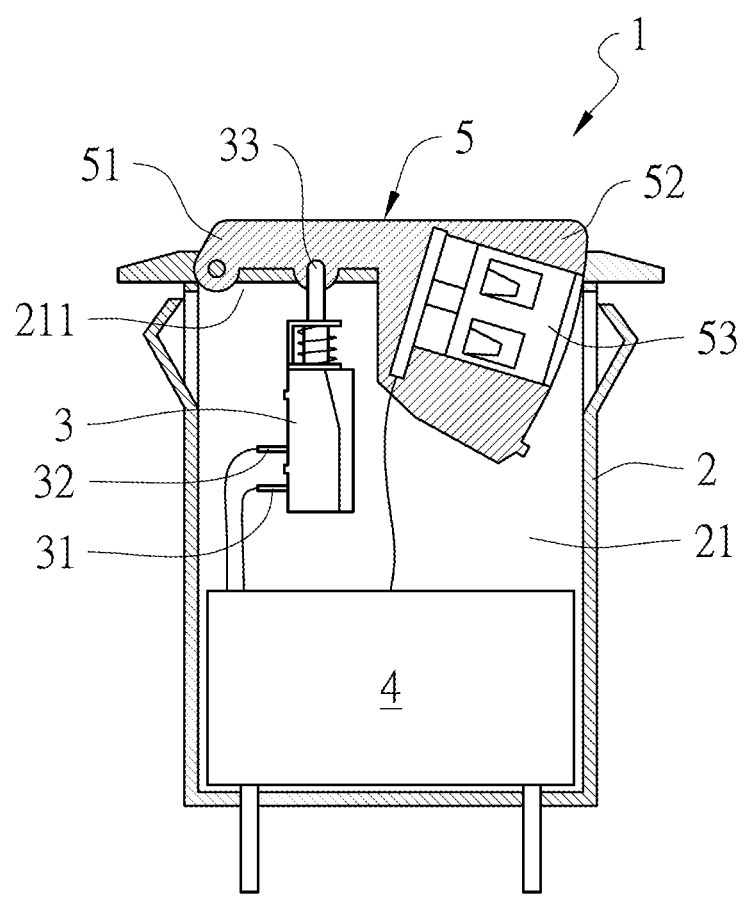
FIG. 2 is a sectional view of the charging socket according to the preferred embodiment of the present invention.
Figure 3:
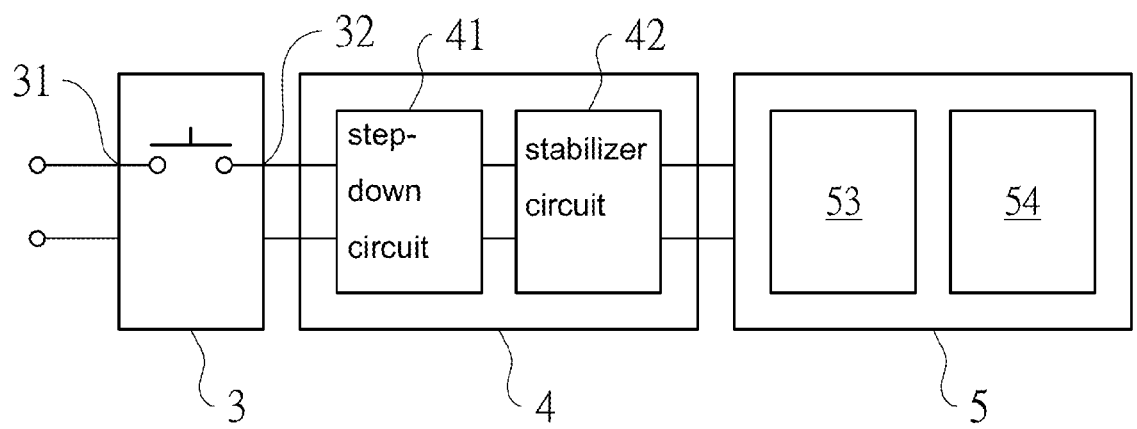
FIG. 3 is a circuit block diagram of a circuit board according to the preferred embodiment of the present invention.

Please refer to FIGS. 1 to 3. A charging socket 1 according to a preferred embodiment of the present invention comprises a casing 2, a press and detain switch 3, a circuit board 4 and a movable base 5.

The casing 2 is roughly a cuboid for correspondingly insetting into a rectangular positioning slot of a device. When the charging socket is embodied, the device is mainly a car or another indoors or outdoors movable or immovable object. The casing 2 is disposed with an accommodating space 21 with an opening 211. In FIG. 2, the opening 211 is disposed at a top of the casing 2. When the casing 2 is installed on a top plate of a cycle, the opening 211 is disposed at a bottom of the casing 2. In this embodiment, the opening 211 is disposed at the top of the casing 2 for illustration.

The press and detain switch 3 is accommodated and positioned inside the accommodating space 21 of the casing 2. A direct current input end 31 and a direct current output end 32 are disposed at an end of the press and detain switch 3. The direct current input end 31 is electrically connected with a battery of a car. A press portion 33 that can be lifted and lowered is disposed at a top end of the press and detain switch 3. Accordingly, when the press portion 33 is pressed one time, the direct current input end 31 and the direct current output end 32 are electrically connected. When the press portion 33 is pressed again, the direct current input end 31 and the direct current output end 32 are electrically interrupted. Generally, the previously mentioned structures are assembled as a single element. The structures are already disclosed in the specifications of Taiwan patent publication number 1233133 "Press and Detain Switch" and Taiwan utility model publication number 205388 "Press and Detain Switch". Even though the above two patents have different structures, they can achieve the same effects of using the press and detain switch 3 for controlling whether the direct current input end 31 and the direct current output end 32 are electrically connected or interrupted. The structures of the press and detain switch 3 are not limited in the present invention since they can be in other forms.

Figure 4:
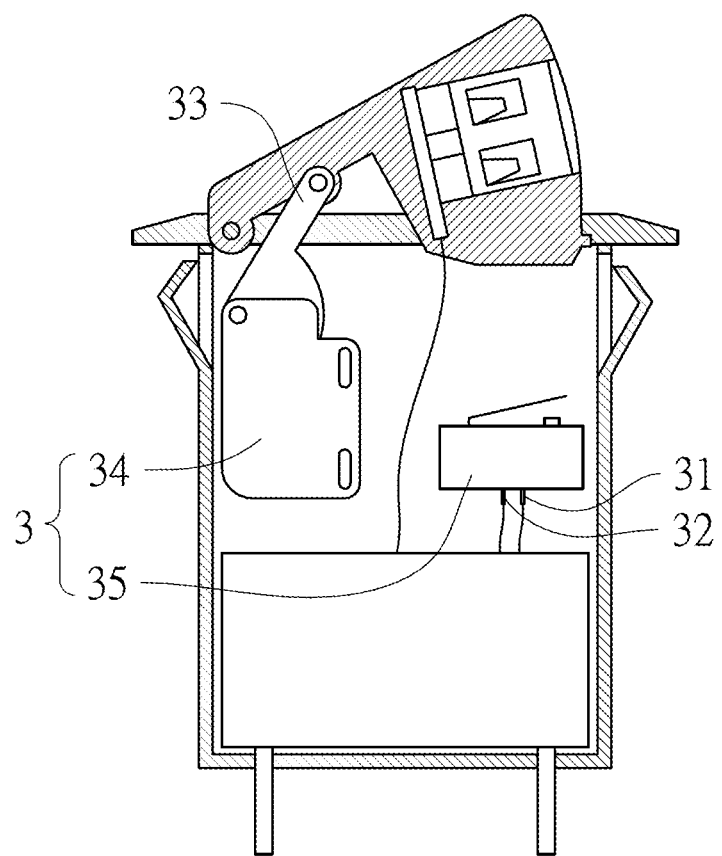
FIG. 4 is a sectional view of a press and detain switch according to another embodiment of the present invention.

When the charging socket 1 is embodied, the press and detain switch 3 comprises a lift driver 34 and a switch 35 as shown in FIG. 4. The press portion 33 is formed at a top end of the lift driver 34. The switch 35 is connected with the direct current input end 31 and the direct current output end 32 at the same time. The direct current input end 31 and the direct current output end 32 can be controlled for being electrically connected or interrupted by pressing the press portion 33. However, the lift driver 34 and the switch 35 are assembled as the press and detain switch 3 in each embodiment. Not only that space can be saved effectively, assembling becomes more convenient.

The circuit board 4 is accommodated and positioned inside the accommodating space 21 of the casing 2. The circuit board 4 has an electrically connected step-down circuit 41 and an electrically connected stabilizer circuit 42. The stabilizer circuit 42 and the direct current output end 32 of the press and detain switch 3 are electrically connected. Accordingly, when the direct current input end 31 and the direct current output end 32 are electrically connected, the direct current voltage inputted via the direct current input end 31 can be reduced, and a stabilized direct current with approximately 5 volts can be outputted.

The movable base 5 is roughly in a sector shape and accommodated and positioned above the opening 211 of the casing 2. The movable base 5 is connected with a top end of the press portion 33. The movable base 5 has a small end portion 51 and an arc portion 52. The small end portion 51 is pivotally connected with a side of the casing 2 so that the movable base 5 can swing downwardly and upwardly using the pivotal end as an axis. Two USB slots are embedded in the arc portion 52. The two USB slots are electrically connected with the circuit board 4. Each of the USB slots is used as a plugging base 53. When the charging socket 1 is embodied, one of the plugging bases 53 or more than one can be disposed. A power indicating light 54 is disposed on a top side of the movable base 5. The power indicating light 54 is electrically connected with the circuit board 4.

Figure 5:
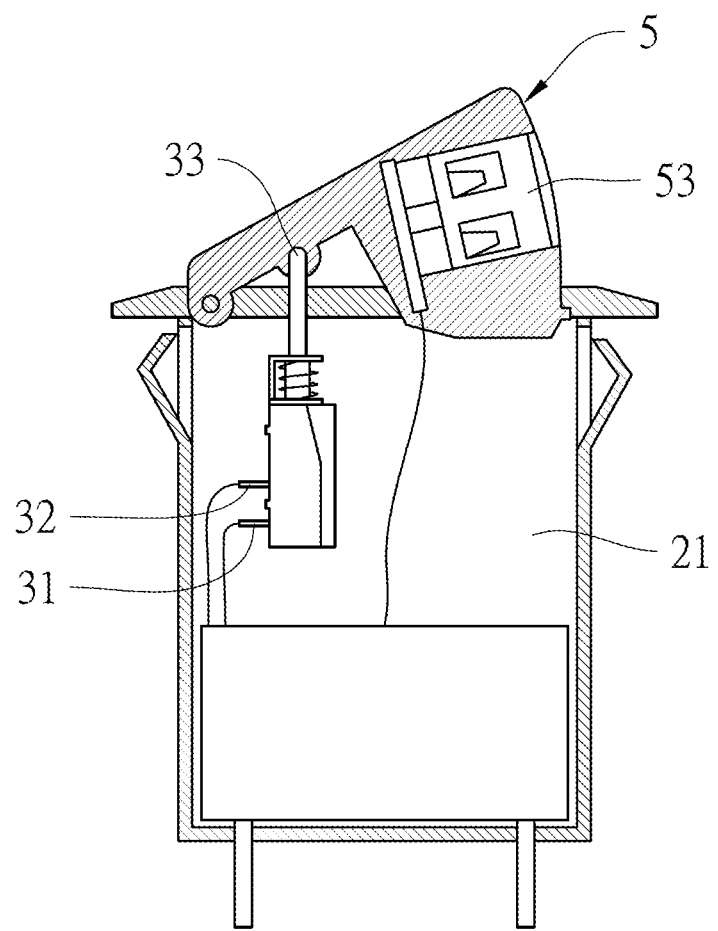
FIGS. 5 and 6 are schematic views of the charging socket being used according to the preferred embodiment of the present invention.
Figure 6:
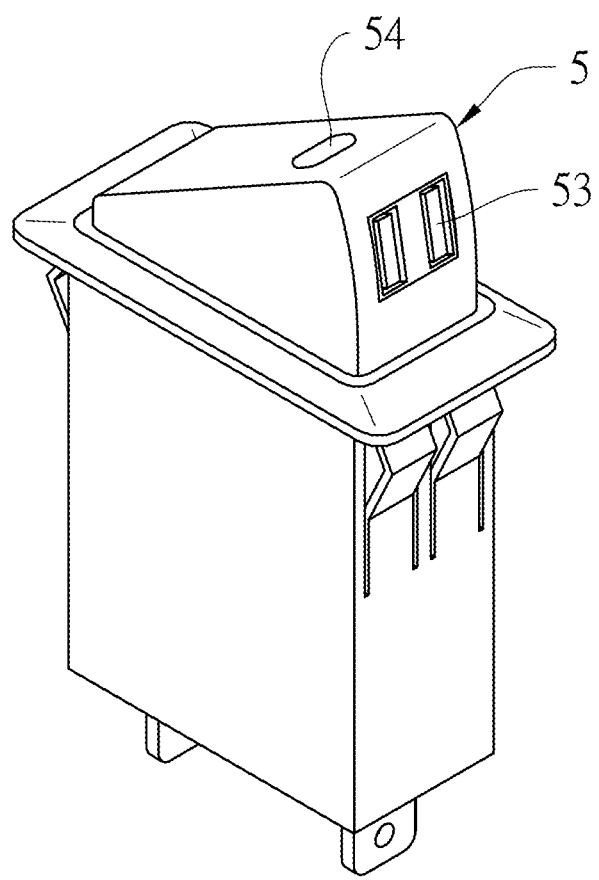

Thereby, as shown in FIGS. 5 and 6, when a user presses the movable base 5 to move with the press portion 33 together, the plugging base 53 is exposed. Electrical devices with USB adapter such as PDA, mobile phone, digital camera and video recorder and MP3 and MP4 can be connected with the plugging base 53. The direct current input end 31 and the direct current output end 32 are electrically connected for outputting 5 volts direct current. At the same time. The power indicating light 54 emits light. When the movable base 5 is pressed again to hide the plugging base 53 inside the accommodating space 21 of the casing 2, the press portion 33 is moved together with the movable base 5 to interrupt the direct current input end 31 and the direct current output end 32 electrically. At the same time, the plugging base 53 stops supplying power and the power indicating light 54 goes out.

Therefore, the charging socket 1 of the present invention has the following advantages:

1. The charging socket 1 is directly positioned inside a car for charging different electrical devices via USB. Therefore, it is very convenient to use.

2. The charging socket 1 allows the plugging base 53 to be exposed when charging is required and hidden when charging is not required. Therefore, not only that it is convenient to use and artistically designed, it can be effectively protected from dust and moisture when the plugging base 53 is hidden for reducing the malfunction probability.

3. The charging socket 1 allows the plugging base 53 to be exposed for connecting electrically and hidden for interrupting electrically; therefore, power source can be saved effectively and safety can be ensured.

As a conclusion from the above descriptions, the expected objectives can be achieved by the charging socket of the present invention which is not only convenient to use and artistically designed, power source can be saved effectively and safety can also be ensured.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A charging socket comprising:
a casing disposed with an accommodating space with an opening;
a press and detain switch accommodated and positioned inside the accommodating space, a direct current input end and a direct current output end being disposed at an end of the press and detain switch, a press portion for controlling whether the direct current input end and the direct current output end being electrically connected or interrupted disposing at another end of the press and detain switch;
a circuit board electrically connected with the direct current output end for reducing a direct current voltage inputted via the direct current input end; and
a movable base positioned above the opening of the casing, one end of the movable base being pivotally connected with the casing, at least one plugging base being inbuilt inside another end of the movable base, the plugging base being electrically connected with the circuit board, the movable base being connected with an end of the press portion, so that when pressing the movable base, the press portion being moved together with the movable base.

2. The charging socket as claimed in claim 1, wherein the circuit board has an electrically connected step-down circuit and an electrically connected stabilizer circuit.

3. The charging socket as claimed in claim 1, wherein the press and detain switch comprises a lift driver and a switch, the press portion is formed on top of the lift driver, the direct current input end and the direct current output end are connected with the switch at the same time.

4. The charging socket as claimed in claim 1, wherein the plugging base is a USB slot.

5. The charging socket as claimed in claim 1, wherein a power indicating light is further disposed on the movable base, the power indicating light is electrically connected with the circuit board, thereby, when the plugging base is electrically connected, the power indicating light emits light.

* * * * *